US007199899B2

(12) United States Patent
Yamano et al.

(10) Patent No.: US 7,199,899 B2
(45) Date of Patent: Apr. 3, 2007

(54) IMAGE RECORDING METHOD AND APPARATUS

(75) Inventors: Akira Yamano, Tokyo (JP); Masayuki Nakazawa, Tokyo (JP); Chika Honda, Tokyo (JP)

(73) Assignee: Konica Corporation, Tokyo (JP)

( * ) Notice: Subject to any disclaimer, the term of this patent is extended or adjusted under 35 U.S.C. 154(b) by 845 days.

(21) Appl. No.: 10/179,493

(22) Filed: Jun. 24, 2002

(65) Prior Publication Data

US 2003/0007194 A1 Jan. 9, 2003

(30) Foreign Application Priority Data

Jul. 3, 2001 (JP) ............................ 2001-201698

(51) Int. Cl.
*G06F 15/00* (2006.01)
*G06K 15/00* (2006.01)

(52) U.S. Cl. ...................................... 358/1.7; 358/1.17

(58) Field of Classification Search ............... 358/1.17, 358/1.1, 1.12, 1.13, 1.18, 448, 474, 486
See application file for complete search history.

(56) References Cited

U.S. PATENT DOCUMENTS 5,029,017 A * 7/1991 Abe et al. ................... 358/451
5,673,077 A * 9/1997 Kawakami et al. ......... 347/183
5,781,215 A * 7/1998 Onishi et al. ............... 347/101
6,178,267 B1 * 1/2001 Sato et al. .................. 382/252
6,731,413 B1 * 5/2004 Nakazawa et al. .......... 358/502
2003/0002064 A1 * 1/2003 Otsuki ....................... 358/1.13

FOREIGN PATENT DOCUMENTS

JP 2001177272 * 6/2001

* cited by examiner

*Primary Examiner*—Gabriel I. Garcia
(74) *Attorney, Agent, or Firm*—Frishauf, Holtz, Goodman & Chick, P.C.

(57) ABSTRACT

A method of recording a transmission image composed of dots on a recording medium having the steps of; moving a recording medium in a sub-scanning direction, and moving a recording head relatively with respect to the recording medium in a main scanning direction which is crossing the sub-scanning direction, wherein a diameter D of a dot recorded on said recording medium falls within a range expressed by $1.5A \leqq D \leqq A+150$ [μm], wherein, $$A=\max(Pm, Ps),$$

Pm=pitch of an array of pixels in the main scanning direction,

Ps=pitch of an array of pixels in the sub-scanning direction.

17 Claims, 11 Drawing Sheets

D = 1.0A

D = 1.5A

D = 3.0A

FIG. 6

| (1) DOT DIAMETER (μm) | (2) RECORDING PITCH (μm) | (3) DEVIDED SCANNING NUMBER OF TIMES n | (4) JETTING PITCH (μm) | (1)÷(2) $\eta$ | (4)÷(1) $\varepsilon$ | GRAININESS (3 LEVEL EVALUATION) |
|---|---|---|---|---|---|---|
| 65 | 20 | 4 | 80 | 3.25 | 1.23 | ○ |
| 65 | 30 | 4 | 120 | 2.17 | 1.85 | ○ |
| 65 | 40 | 4 | 160 | 1.63 | 2.46 | ○ |
| 65 | 50 | 4 | 200 | 1.3 | 3.08 | △ |
| 65 | 60 | 4 | 240 | 1.08 | 3.69 | △ |
| 65 | 80 | 4 | 320 | 0.18 | 4.92 | × |
| 65 | 100 | 4 | 400 | 0.65 | 6.15 | × |

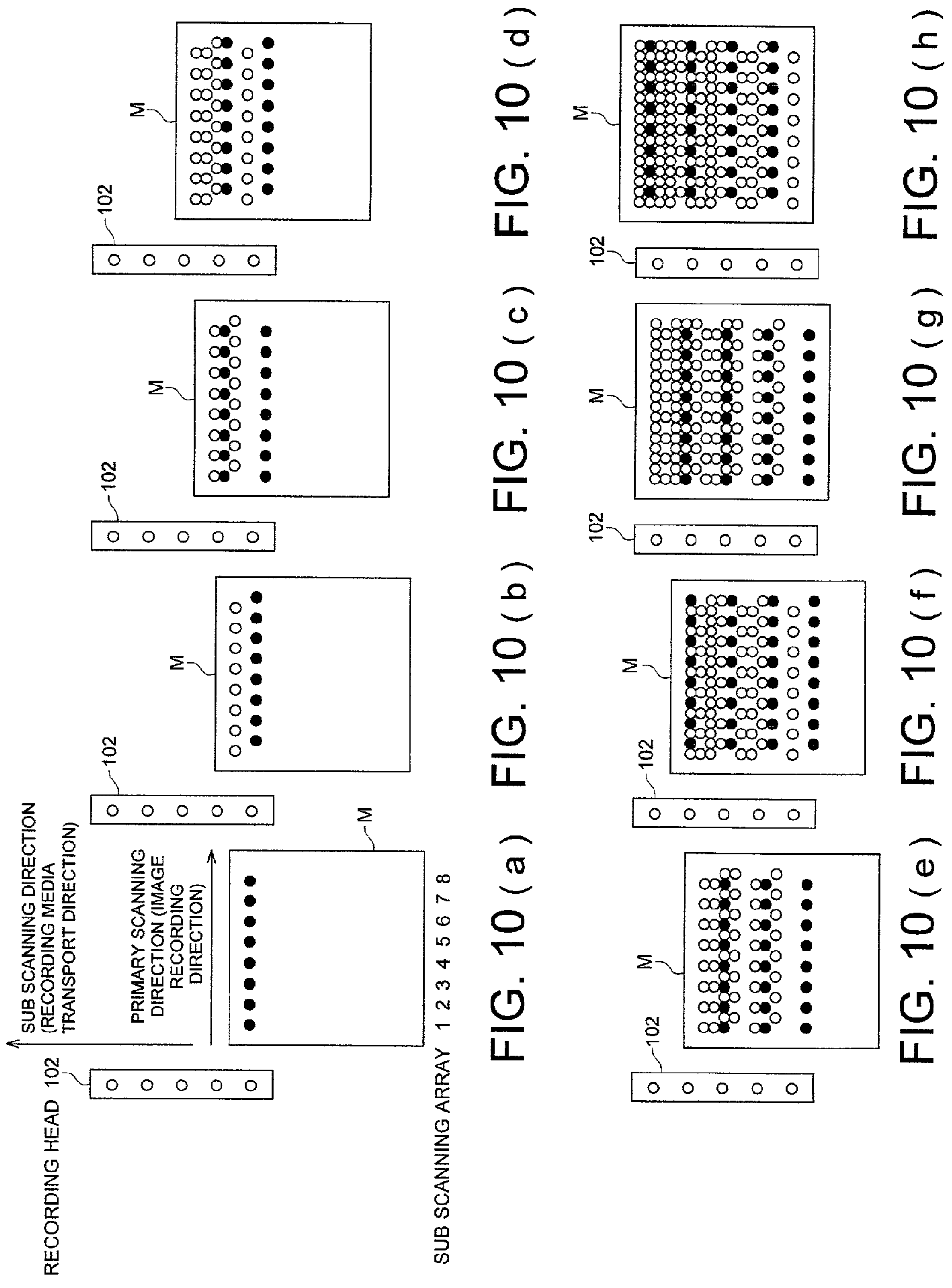
FIG. 10 ( a )
FIG. 10 ( b )
FIG. 10 ( c )
FIG. 10 ( d )
FIG. 10 ( e )
FIG. 10 ( f )
FIG. 10 ( g )
FIG. 10 ( h )

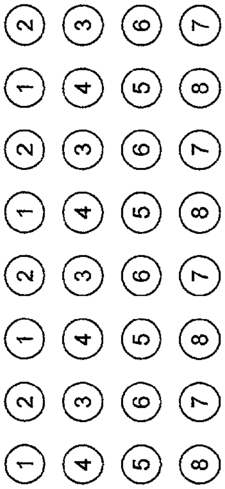
FIG. 11 (a - 1)
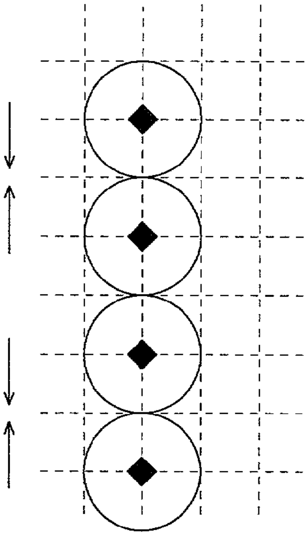
FIG. 11 (a - 2)
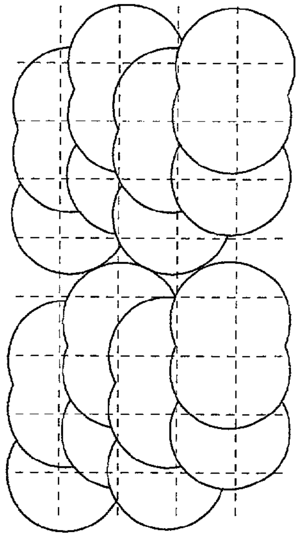
FIG. 11 (a - 3)
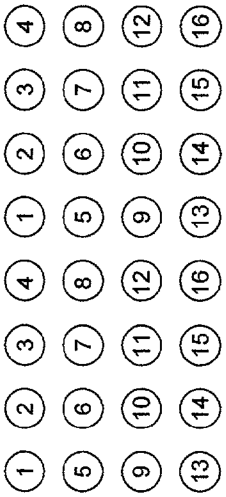
FIG. 11 (b - 1)
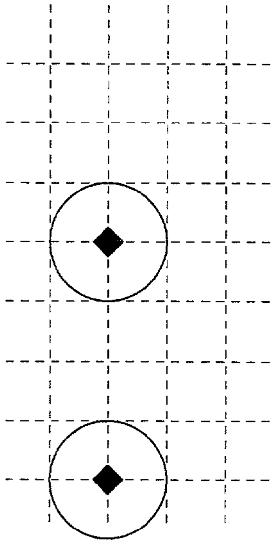
FIG. 11 (b - 2)
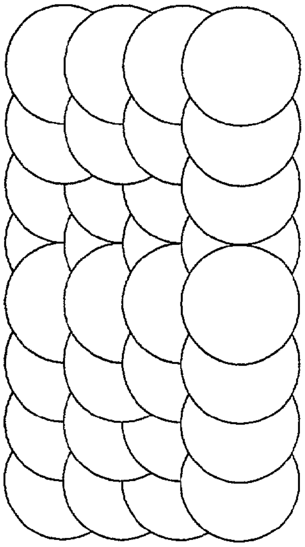
FIG. 11 (b - 3)

FIG. 12

| (1) DOT DIAMETER (μm) | (2) RECORDING PITCH (μm) | (3) DEVIDED SCANNING NUMBER OF TIMES n | (4) JETTING PITCH (μm) | (1)÷(2) $\eta$ | (4)÷(1) $\varepsilon$ | STREAKINESS (3 LEVEL EVALUATION) |
|---|---|---|---|---|---|---|
| 65 | 30 | 1 | 30 | 2.17 | 0.46 | × |
| 65 | 30 | 2 | 60 | 2.17 | 0.92 | × |
| 65 | 30 | 3 | 90 | 2.17 | 1.38 | △ |
| 65 | 30 | 4 | 120 | 2.17 | 1.85 | ○ |
| 65 | 30 | 5 | 150 | 2.17 | 2.31 | ○ |
| 65 | 30 | 6 | 180 | 2.17 | 2.77 | ○ |

IMAGE RECORDING METHOD AND APPARATUS

BACKGROUND OF THE INVENTION

This invention relates to a method and an apparatus for recording an image on a recording medium for a transmission image, and in particular, to an image recording method and an image recording apparatus in which an image composed of dots is formed on a recording medium which is movable in the sub-scanning direction by relatively moving a recording head with respect to said recording medium in the main scanning direction which is crossing said sub-scanning direction.

In recent years, in X-ray radiography, in place of an intensifying screen/film system (S/F), a system for picking up a digital electrical signal of an X-ray image such as computed radiography (CR) or a system employing a flat panel X-ray detector (FPD) has appeared. With the spreading of what is called a digital X-ray image pickup apparatus, also a digital medical image recording apparatus for recording a medical-use image on the basis of an electrical signal obtained by CR or an FPD system is spreading.

A recording method which has now become the greatest mainstream is a silver halide laser writing method in which an image is formed through converting an electrical signal of an X-ray image obtained by CR or an FPD system into laser beam intensity variation and carrying out print and development processing on a conventional silver halide film.

However, because the method uses a silver halide film in the same way as a conventional method, there is a problem that it is troublesome and costs much.

As regards a method not using a silver halide film, a thermal transfer method or a sublimation-type printer can be considered. However, in the case of a thermal transfer method, the ink of a recorded image is present on the uppermost surface of a film, which produces a trouble such that ink is easy to be transferred in handling. Further, in the case of a sublimation-type printer, sufficient density cannot be obtained and waste matter such as an ink ribbon is produced after image formation as in the case of a thermal transfer method.

Lately, an image recording apparatus employing an ink jet method has become versatile as a small-sized low-priced printer which enables the great improvement of the resolution and quality of a recorded image. Therefore, by applying an ink jet recording apparatus to X-ray image formation, the above-mentioned trouble is to be solved, and it is expected that an ink jet image forming method capable of forming an X-ray image which is made of low cost and easy to watch by making the most of the advantage of an ink jet printer can be provided.

In a medical-use image used mainly in diagnosis, in an image recording apparatus of not only an ink jet method but also all other recording methods, an extremely high image quality is required.

The reason is that because a medical-use image is always watched as a transmission image by putting it on a lighting box of a high illuminance in diagnosis, the density resolving power of human visual sensation becomes very much higher as compared to the case of a reflection image.

Further, a two-dimensional X-ray radiograph such that is radiographed by CR or an FPD system, what is called a simple X-ray radiograph, is basically a monochromatic image; in the case of a monochromatic image, because the density resolving power of human visual sensation is higher as compared to the case of other colors (for example, Y, M, C, etc.), a further higher image quality is required for a monochromatic transmission image.

Thus, in respect of indices to become the reference of image quality evaluation, which are the three items, namely, (1) gradation, (2) sharpness, and (3) granularity, an investigation concerning whether or not an image quality level required for a medical use can be achieved by an ink jet type recording apparatus has been practiced.

[Gradation]

It is said that the number of gray levels in a simple X-ray radiograph required for diagnosis is 10 bits (=1024 gray levels), and further, the number of gray levels enabling sufficient diagnosis is 12 bits (=4096 gray levels). In the case where an image of multiple gray levels such as a medical-use image is expressed by an ink jet method, because the number of ink density levels is limited, it is necessary to make the gradation expression of a recorded image in a digital way. For example, there is a method in which one pixel of image data is composed of a matrix having a plurality of elements, for example, a dither matrix of 4×4 elements, and gradation expression of 4×4+1=17 gray levels is made by using so called a dither method with this dither matrix made a unit.

Further, by using a plurality of kinds of ink, for example 4 kinds of ink, having colors of the same hue but different densities respectively, the number of gray levels to be produced can be increased innumerably.

However, actually it is general that gradation expression is made on the basis of an error diffusion method by selecting several to several tens of dither matrices out of all the dither matrices that are able to be produced and utilizing these several to several tens of dither matrices.

As regards the literatures concerning an error diffusion method, for example, it is described in detail in 'R. FLOYD & L. STEINBERG, "AN ADAPTIVE ALGORITHM FOR SPATIAL GRAY SCALE", SID 75 DIJEST, pp. 36 to 37'. By using this gradation forming method composed of a dither method combined with an error diffusion method, multiple gray scale expression of 12 bits is possible, and by selecting suitable dither matrices and using a suitable error diffusion algorithm, it is possible to obtain a smooth gradation characteristic.

[Sharpness]

Sharpness, that is, the contrast of an image is important for a medical-use image having a purpose of diagnosis. For example, concerning an image of a foot, such a degree of sharpness as to make it possible to recognize trabeculae of bone clearly is desirable.

Because the unit of recording is an ink dot in an ink jet method, there is no factor to influence neighboring pixels other than the spreading of the ink dot diameter. Because there is no influence such as diffusion of light in a sliver halide laser writing method or remaining heat in a thermal transfer method, an image having a comparatively high sharpness can be obtained.

[Granularity]

Granularity, that is, the smoothness with no appearance of roughness is important for a medical-use image having a purpose of diagnosis. For example, concerning an image of a chest part, especially in a low density region, such a degree of granularity as to make it possible to recognize correctly the shade of a morbid portion etc. is desirable.

Because the unit of recording is an ink dot in an ink jet method, it sometimes occurs a case where the whole image is not covered with ink dots but a clearance is produced between dots. As the result, because sometimes the density appears low in general, or the image appears rough, the granularity appears rather bad.

One method of reducing granularity is to jet fine ink particles in extremely high density. However, in case of fine particles, in order to cover the whole area of the image without clearance it is necessary to jet ink particles in almost the same area. To enable this, the ink absorbing speed and the ink absorbing amount of the recording media need to be improved. Further, for a medical-use image being used for a diagnoses which is desirable to have the maximum output image density of 3.0, in order to achieve the maximum image density of 3.0 by ink jet printing, a large amount of ink is required to be used.

On the other hand, as regards a means for improving granularity, a method in which the dot diameter is made larger to eliminate the clearances between dots can be considered; however, on the contrary, in some cases it occurs a phenomenon, what is called "beading", which is a phenomenon such that neighboring ink dots are coupled, and the granularity becomes rather bad. Further, because the tendency to produce the beading varies in accordance with the external environment such as the room temperature, a stable output density is not always obtained, and as the result of it, sometimes gradation characteristic is lowered. Further, if the dot diameter is made excessively larger, sometimes recorded image is blurred and degradation of sharpness is brought about.

This invention has been made in view of the above-mentioned problems, and it is its object to provide an image recording method and apparatus capable of obtaining a high-quality print image with the suppressed image deterioration caused by the fluctuating factors in recording such as the dot diameter of ink and the deviation of landing position of an ink drop.

SUMMARY OF THE INVENTION

The structure to solve the above-mentioned problems is:

(1) An image recording method characterized by it that, in an image recording apparatus in which an image composed of dots is formed on a recording medium which is movable in the sub-scanning direction by relatively moving a recording head with respect to said recording medium in the main scanning direction which is crossing said sub-scanning direction, the dot diameter D recorded on said recording medium falls within a range expressed by $1.5A \leqq D \leqq A+150$ [μm], where $$A=\max(Pm, Ps),$$

Pm=pitch of the array of pixels in the main scanning direction,

Ps=pitch of the array of pixels in the sub-scanning direction.

By making the dot diameter recorded on the aforesaid recording medium fall within a range expressed by $1.5A \leqq D \leqq A+150$ [μm], it can be obtained a high-quality print image with the fluctuating factors in recording such as the dot diameter of ink and the deviation of landing position of an ink drop suppressed.

(2) An image recording method as set forth in the structure (1) characterized by it that the aforesaid dot diameter falls within a range expressed by $2A \leqq D \leqq A+75$ [μm].

By making the dot diameter recorded on the aforesaid recording medium fall within a range expressed by $2A \leqq D \leqq A+75$ [μm], it can be obtained a high-quality print image with the fluctuating factors in recording such as the dot diameter of ink and the deviation of landing position of an ink drop further suppressed.

(3) An image recording method as set forth in the structure (1) or (2) characterized by it that the resolution is not lower than 360 dpi.

By making the resolution not lower than 360 dpi, a high-quality image can be obtained.

(4) An image recording method as set forth in the structure (1) or (2) characterized by it that the resolution is not lower than 720 dpi.

By making the resolution not lower than 720 dpi, a higher-quality image can be obtained.

(5) An image recording method as set forth in any one of the structures (1) to (4), characterized by it that an image is completed by scanning a main-scanning image line, which is an image line composed of pixels arrayed in the main scanning direction, a plurality of times.

By completing an image through scanning a main-scanning image line, which is an image line composed of pixels arrayed in the main scanning direction, a plurality of times, streaky unevenness caused by an error in the amount of transport of the recording medium in the sub-scanning direction can be reduced.

(6) An image recording method as set forth in any one of the structures (1) to (5), characterized by it that the writing pitch Pm' in the main scanning direction in one time scanning falls within a range expressed by $Pm' \geqq 2Dave$, where Dave denotes the average value of the dot diameters recorded on the aforesaid recording medium.

With the average value of the dot diameters recorded on the aforesaid recording medium denoted by Dave, by making the writing pitch Pm' in the main scanning direction in one time scanning fall within a range expressed by $Pm' \geqq 2Dave$, image quality becomes satisfactory in spite of the fluctuation in the size of the dot diameter and the landing position of dots, without bringing about the degradation of granularity, edge emphasis, etc. owing to the beading (coupling of neighboring dots) in one and the same scanning line.

(7) The method of recording a transmission image as set forth in the structure (1), wherein diameters of the dots on the recording medium are approximately of a same size.

(8) The method of recording a transmission image as set forth in the structure (1), wherein the transmission image is composed of a plurality of sizes of dots on the recording medium, a maximum diameter of the plurality of sizes of dots $D_{max}$ falls within a range expressed by $$1.5A \leqq D_{max} \leqq A+150$$

(9) An image recording apparatus characterized by employing an image recording method as set forth in any one of the structures (1) to (8).

By employing an image recording method as set forth in any one of the structures (1) to (8), it can be obtained a high quality print image with the influence of the fluctuating factors in recording such as the dot diameter of ink and the deviation of the landing position of an ink drop suppressed.

(10) The image recording apparatus as set forth in the structure of (9), wherein the recording head is an inkjet head.

By applying the inkjet method for the image recording apparatus of the present invention, preferable effects can be obtained.

(11) The image recording apparatus as set forth in the structure of (10), wherein the image recording apparatus records an image by using a plurality of different density inks having a same hue.

By using a plurality of different density inks having a same hue, a stable high gradation image can be obtained.

(12) The image recording apparatus as set forth in the structure of (10), wherein the image recording apparatus records a medical-use image.

The effect of the present invention is remarkable for the medical-use image where high image quality is required.

BRIEF DESCRIPTION OF THE DRAWINGS

FIG. 6 is a drawing showing the result of granularity evaluation being actually done visually through producing uniform-density images with the pitch in the main scanning direction varied;

FIG. 10(*a*) to FIG. 10(*c*) are outline drawings of a multiple scan recording method;

FIG. 11(*a*-1) to FIG. 11(*b*-3) are drawings representing the states of images after recording depending on the difference of the recording method; and FIG. 12 is a drawing showing the result of making a subjective evaluation for streaky unevenness.

DETAILED DESCRIPTION OF THE PREFERRED EMBODIMENT

In the following, an image recording apparatus of an example of the embodiment of this invention will be explained by using the drawings.

An image forming apparatus of this example of the embodiment is an apparatus outputting an image by what is called ink jet, in which an image is formed through jetting fine ink particles on the basis of an inputted image signal by a method utilizing piezoelectric effect known to public or a method utilizing the thermal expansion of bubbles caused by heating.

This invention to be explained hereinafter is not limited to this example of the embodiment.

Figure 2:
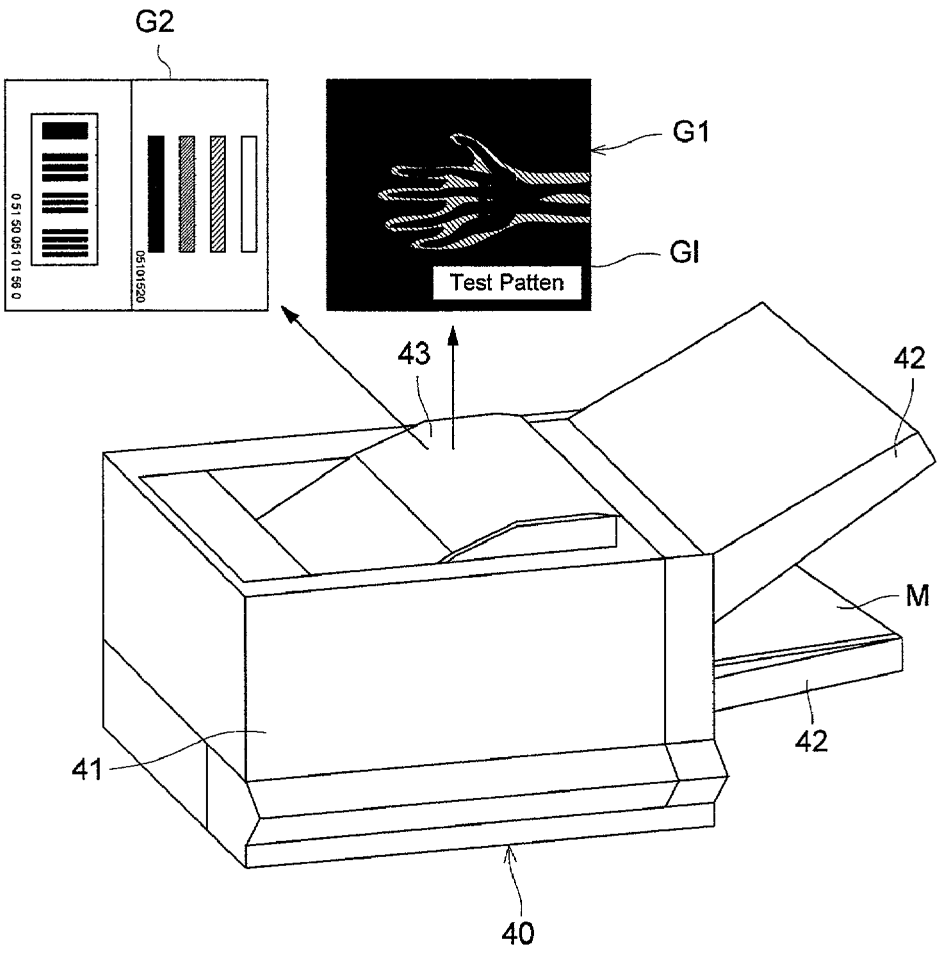
FIG. 2 is a drawing for explaining the overall structure of an ink jet recording apparatus of this example of the embodiment of the invention.

First, by using FIG. 2, the overall structure of an image recording apparatus of this example of the embodiment will be explained. The image recording apparatus of this example of the embodiment is an ink jet recording apparatus for medical use.

The ink jet recording apparatus 40 is capable of forming an image having a halftone area by applying quasi-halftone processing such as error diffusion and dither to an image signal inputted and making ink adhere to a recording medium by an ink jet method on the basis of the processed image signal.

This ink jet recording apparatus 40 is designed to have a function such that a recording medium M set in one, for example the lower one, of the feed trays 42, which are provided in the apparatus mainframe 41 in two stages for example, is transported to the inside of the apparatus mainframe 41, and the recording medium M, on which images G1 and G2 have been formed, can be taken out onto the discharging portion 43.

Next, by using FIG. 1, the electrical structure of the ink jet recording apparatus 40 shown in FIG. 2 will be explained.

The recording medium M is supposed to be movable in the direction of the arrow mark A (sub-scanning direction) by a pair of transport rollers 12.

A recording head unit 101 is movable in the direction (the direction of the arrow mark B: main scanning direction) approximately perpendicular to the moving direction (sub-scanning direction) of the recording medium M.

In the recording head unit 101 of this example of the embodiment, recording heads 102 for jetting inks of yellow (Y), magenta (M), cyan (C), and black (K) respectively are arranged in a line. By making a combination of different hue inks, images of any color can be recorded. Further by using inks of different colors such as Y, M, and C, a monochromatic image can also be recorded. These heads maybe integrally made up or may be provided individually as separate heads.

Further, it may be possible not only to use a combination of inks of different colors such as Y, M, C, and K but also to use a combination of inks of colors having the same hue but different densities respectively. The "inks of colors having the same hue but different densities respectively" means inks using dyes or pigments of colors of the same hue but having different concentrations of the dyes (pigments) contained respectively. For example, the above-mentioned inks mean such ones satisfying the condition that when approximately uniform-density images of 4 kinds, each of which uses only one of the inks K1, K2, K3, and K4, which are composed of the same K dye but have different dye concentrations respectively, the optical densities of the images recorded are different to one another. By recording an image with inks of colors having the same hue but different densities respectively, it becomes possible to form a monochromatic image having a higher gradation characteristic.

Further, in each of the recording heads 102, a plurality of recording elements (nozzles) are arranged with an array pitch X in the sub-scanning direction.

Image data, which are inputted from the outside of the apparatus (an external radiographing apparatus, or a storage apparatus), are subjected to quasi-halftone processing such as error diffusion and dither by an image processing means 121, and sent to the recording head 102 of the recording unit 101 through a recording element driving means 517.

In response to a head transport signal obtained by the image processing means 121, a control means 103 drives the recording head unit 101 in the main scanning direction through a recording head transporting means 104, and drives the recording medium M in the sub-scanning direction through a transport roller driving means 122.

Further, in response to the image data obtained by the image processing means 121, the control means 103 drives the recording head 102 of the recording head unit 101 through the recording element driving means 517, and forms an image on the recording material M.

Figure 3:
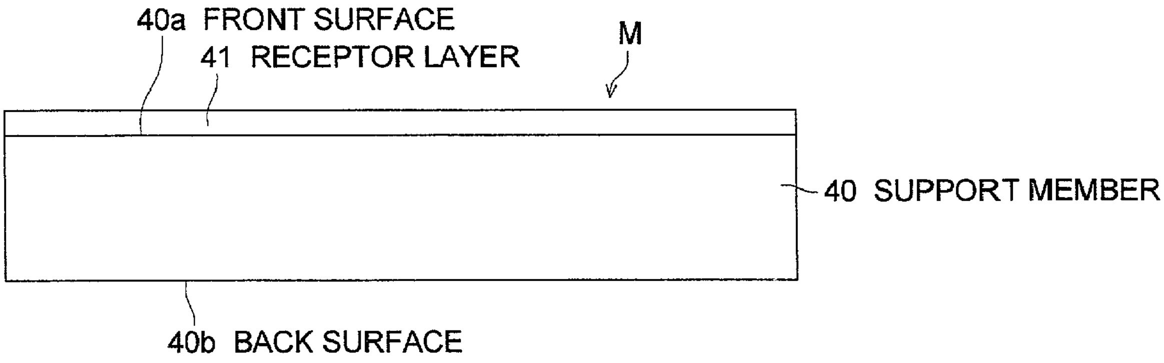
FIG. 3 is a drawing of the structure of a recording medium in FIG. 1.

Next, by using FIG. 3, which is a structural drawing of a recording medium M, a recording medium M will be explained.

The recording medium M is composed of a receiving layer 41 which is easy to absorb ink formed on the surface 40*a* of a transparent supporting member 40, and an image is to be recorded in this receiving layer 41. It is desirable to provide a back-coat layer having functions such as curl preventing, preventing the adherence to other recording medium sheet, and charge preventing, because it makes the recording medium easy to handle. Further, it is desirable to provide a layer having a function of reflection reducing on the front and/or rear surface, because it can reduce reflection light and makes diagnosis easy to perform. Further, also it is possible to form a receiving surface on the rear surface to record an image on the rear surface too.

As regards the transparent supporting member 40 of this example of the embodiment, for example, one described in the publication of the unexamined patent application H10-76751 is desirably used.

A desirable supporting member is made of polyester obtained by condensation polymerization of diol and dicarboxylic acid. A desirable dicarboxylic acid includes terephthalic acid, isophthalic acid, phthalic acid, naphthalene dicarboxylate, adipic acid, and sebacic acid. A desirable diol includes ethylene glycol, trimethylene glycol, tetramethylene glycol, and cyclohexane dimethanol. A specified polyester which is suitable to be used in this invention includes polyethyleneterephthalate, polyethylene-p-hydroxybenzoate, poly-1,4-cyclohexylenedimethylenterephthalate, and polyethylene-2,6-naphthalenecarboxylate. Polyethyleneterephthalate is the most desirable polyester for the supporting member owing to its excellent water-resisting nature, chemical stability, and durability.

The receiving layer 41 is formed on the supporting member by coating, and the receiving layer 41 coated on this supporting layer 40 contains a binder composed of a water soluble polymer and a water-insoluble polymer. As regards the amount of this combination of a water-soluble polymer and a water-insoluble polymer, the water-insoluble polymer is contained with an amount of at least 15% by weight and not more than 90% by weight; further, an inorganic particulate material having a hydrodynamic diameter of not greater than 0.3 μm in water is contained with an amount of at least 50% by weight and not more than 95% by weight to the total coated amount of the water-soluble polymer, the water-insoluble polymer, and the inorganic particulate material.

The water-soluble polymer desirably includes at least one compound selected from a group consisting of polyvinylalcohol, polyacrylamide, methylcellulose, polyvinylpyrrolidone, and gelatine. More desirably, the water-soluble polymer should include a polymerized product of a monomer selected from a group consisting of vinylalcohol, acrylamide, and vinylpyrrolidone.

The water-insoluble polymer desirably includes at least one polymerization monomer selected from a group consisting of acryl, olefine, vinyl, urethane, and amide. Most desirably, the water-insoluble polymer should include at least one polymerization product of a monomer selected from a group consisting of acryl, urethane, polyolefine, and vinyl latex. The water-insoluble polymer can contain a polar functional radical. However, the degree should be lower than a level enough to form a water-soluble polymer.

The total amount of coating of the inorganic particulate material, the water-soluble polymer, and the water-insoluble polymer is desirably at least 0.1 $g/m^2$. If the total coating amount is less than 0.1 $g/m^2$, the adhesion ability between phase-transitioned ink and the receiving layer is lowered to a level which is practically inappropriate. Further, the coating efficiency is lowered at the coating amount less than 0.1 $g/m^2$, and this is not desirable for the manufacturing cost of the recording medium. The total amount of coating of the inorganic particulate material, the water-soluble polymer, and the water-insoluble polymer should more desirably be at least 0.3 $g/m^2$.

If the recording medium M is a transmitting recording medium, diagnosis can be made for a transmission image, and a delicate density variation in an object region can be easily recognized. Further, because the effect that the density in a non-object region can be made higher in this example of the embodiment makes a transmission image be recognized more remarkably than a reflection image, it is desirable to apply this invention to a transmitting recording medium.

Further, it is desirable that the recording medium M is colored, because an image which is easy to recognize can be obtained owing to the reduction of reflection. If the color is substantially blue, because blue is a receding color, this makes human eyes less fatigued and makes diagnosis psychologically easy; that is desirable. Further, if the transmission density of the colored transmitting recording medium M is not lower than 0.03 and not higher than 0.2, the reflection is reduced without lowering the transmitting ability, and an image to make a more correct diagnosis possible can be obtained; that is desirable.

Figure 1:
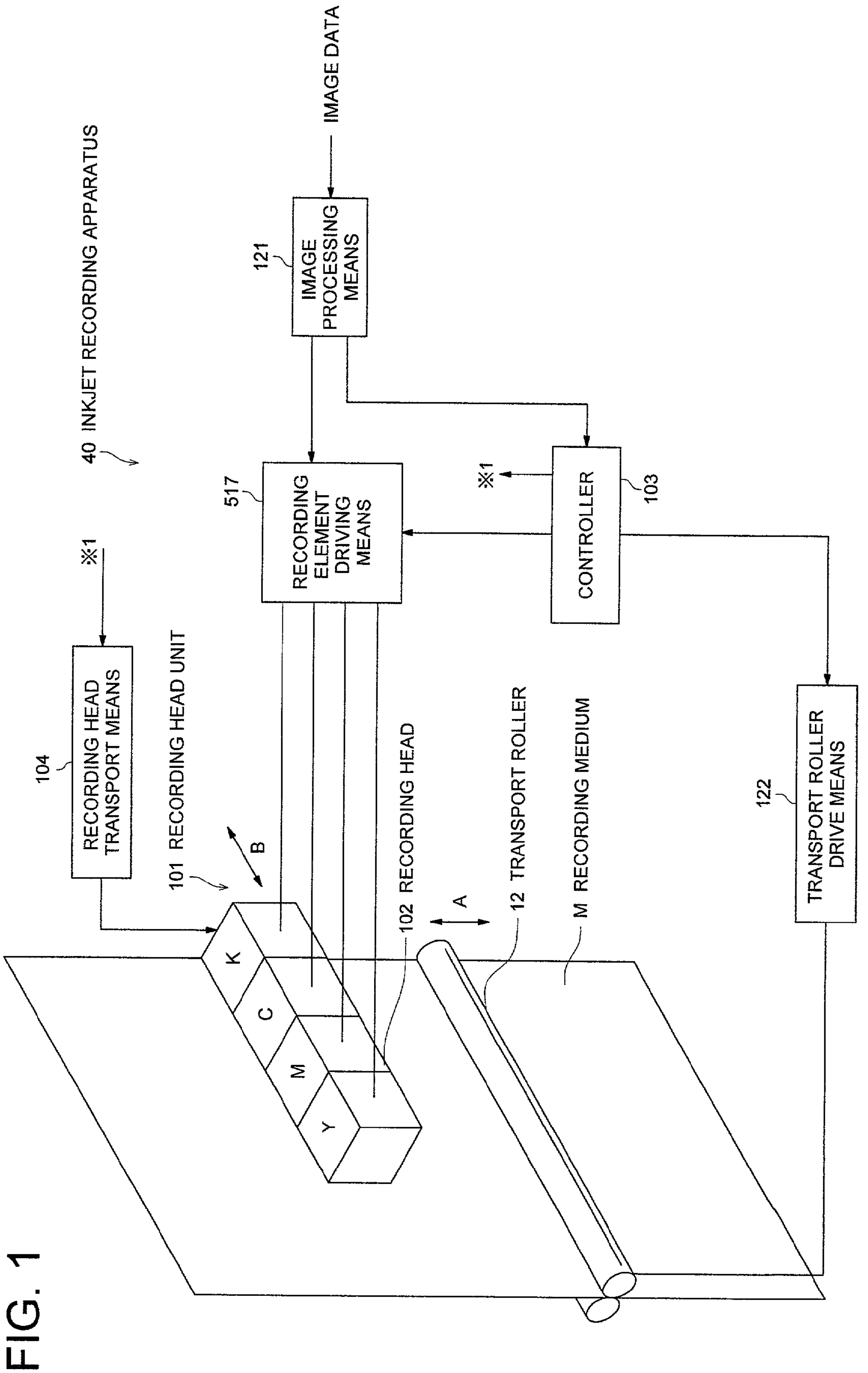
FIG. 1 is a drawing for explaining the electrical structure of an ink jet recording apparatus of an example of the embodiment of the invention.
Figure 4:
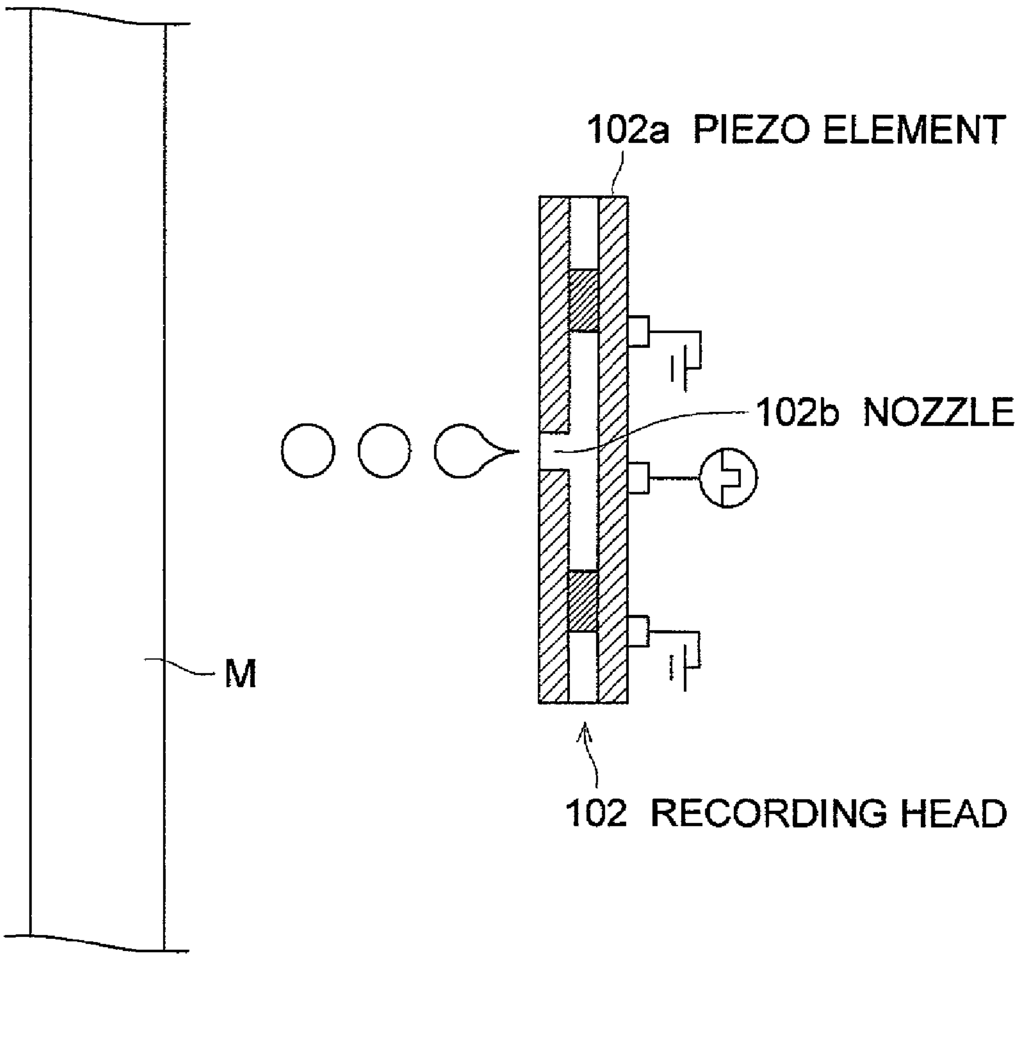
FIG. 4 is a drawing of the structure of the recording head shown in FIG. 1.

FIG. 4 is a structural drawing of an example of the recording head shown in FIG. 1.

As shown in the drawing, the recording head has a structure such that, in the neighborhood of the nozzles 102*b* of each recording head 102, a piezoelectric element 102*a* is provided, which is made to expand and contract by an electric voltage applied to it, and in response to an image signal, ink drops are jetted from the front end of the nozzle toward the recording medium M.

Further, by varying the electric voltage to be applied to the piezoelectric element periodically in timeline, the volume of the ink drops jetted from the nozzle can be controlled to be approximately the same, and approximately same sized dots can be formed on the recording medium.

Further, by controlling the electric voltage to be applied to the piezoelectric element sophisticatedly, the volume of the ink drops jetted from the nozzle can be controlled in several steps, and different sized dots (multi size dotes) can be formed on the recording medium.

Furthermore, by controlling the volume of the ink drops jetted from the nozzle according to the properties of the recording medium and the ink, required diameter of ink can be obtained.

In the above example, although inkjet method using the piezoelectric element is explained, so called a bubble jet method using a heat element can be also effectively used.

(Relation Between Dot Diameter and Granularity)

Next, the relation between the dot diameter with respect to the recording pitch and granularity will be explained. In the above, the dot diameter means the diameter of an approximately circular pattern formed with dye or pigment when an ink drop has been absorbed by the recording medium to become almost fixed after it landed on the recording medium. Further, the recording pitch means the distance between dots arrayed in the main scanning direction or that in the sub-scanning direction after recording has been finished; hereinafter, the former is called the main scanning recording pitch, and the latter is called the sub-scanning recording pitch. Further, as an index representing the relation between the dot diameter and the recording pitch, the ratio of the dot diameter to the recording pitch η is defined by η=(dot diameter)/(recording pitch).

Figure 5:
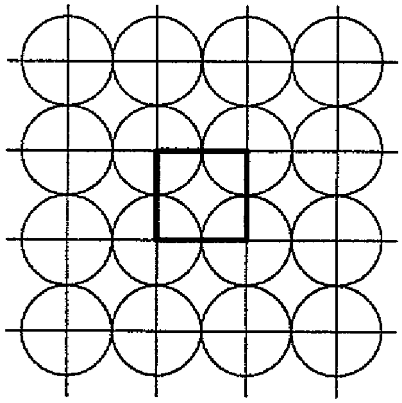
FIG. 5(A) to (*c*) are schematic drawings showing the overlapping of ink dots in the case where ink drops having the same density are put uniformly at equal intervals on the lattice points of a square lattice.
Figure 5:
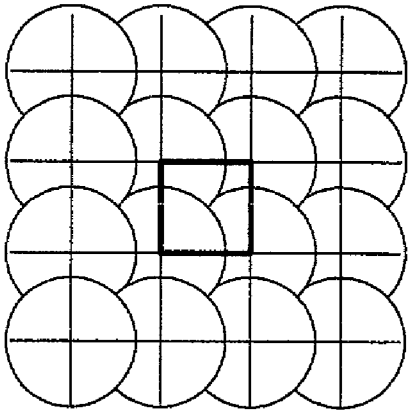
Figure 5:
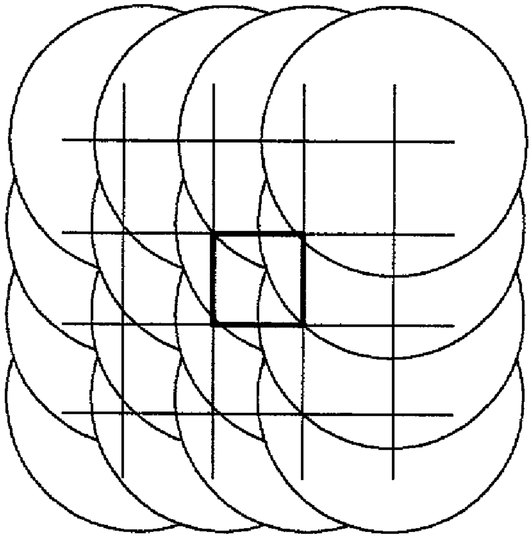

FIG. 5(*a*) to 5(*c*) represent schematic drawings showing the overlapping of ink dots in the case where ink drops of the same density are put uniformly at equal intervals on the lattice points of a square lattice. In the following, it is taken for instance a case where an image is recorded by means of an ink jet image recording apparatus having a resolving power of 1440 dpi in the main scanning direction and 1440 dpi in the sub-scanning direction (corresponding to the lattice spacing of 17.5 μm).

FIG. 5(*a*) represents a schematic drawing of the dot overlapping in the case where the dot diameter is equal to the lattice spacing (η=1.0), that is, the dot diameter is 17.5 μm. Because portions being void of print are produced owing to no overlapping of dots one another, the fluctuation of density tends to be generated against different measurement positions. Further, because the clearance portion is enlarged to become easy to be detected even for a small amount of deviation of the landing position of ink drops, a higher precision of ink landing is required, which is not desirable.

FIG. 5(*b*) represents a schematic drawing of the dot overlapping in the case where the dot diameter is 1.5 times the lattice spacing (η=1.5), that is, the dot diameter is 26.3 μm. As compared to the case of η=1.0, there are larger overlapping portions of dots, and the density fluctuation is hard to be generated against different measurement positions.

FIG. 5(*c*) represents a schematic drawing of the dot overlapping in the case where the dot diameter is 3 times the lattice spacing (η=3.0), that is, the dot diameter is 52.5 μm. As compared to the case of η=1.5, there are further larger overlapping portions of dots, and because ink dots overlap one another to a broader extent to cover the whole surface of the recording medium, an extremely good uniform-density image can be obtained. Further, by making the dot diameter sufficiently larger than the recording pitch, it can be obtained an effect that, even in the case where deviation of ink landing position occurs owing to factors such as bending of nozzles in the recording head and the adhesion of ink at the surface of nozzles, clearance caused by the deviation of ink landing position is difficult to be produced.

FIG. 6 is a drawing showing the result of a granularity evaluation actually made visually by producing uniform-density images with the main scanning recording pitch varied. As regards the recording condition in producing the uniform-density images, only the main scanning recording pitch was varied, and the sub-scanning recording pitch (1440 dpi), the amount of a jetted ink drop (about 7 pl per drop), the composition of the recording medium, and the composition of the ink were all kept the same. By varying the driving speed of the recording head for the main scanning, the main scanning recording pitch was varied to various values from 20 to 100 μm. Besides, as regards the evaluation reference, 3 grade evaluation consisting of A: satisfactory level, B: somewhat noticeable level, and C: noticeable level was made. As the result of the evaluation, it was confirmed that there was a threshold of η for good granularity between 1.30 and 1.63, and for a larger value of η, a good granularity could be obtained.

(Relation Between Dot Diameter and Gradation)

The relation between the dot diameter with respect to the recording pitch and the gradation characteristic will be explained. As regards the evaluation items for gradation characteristic, (1) smoothness of the gradation characteristic curve, (2) gradation reproducibility, etc. can be cited, and in particular, the gradation reproducibility, the latter one, and the stability of density in respect of the image recording apparatus will be considered.

Figure 7:
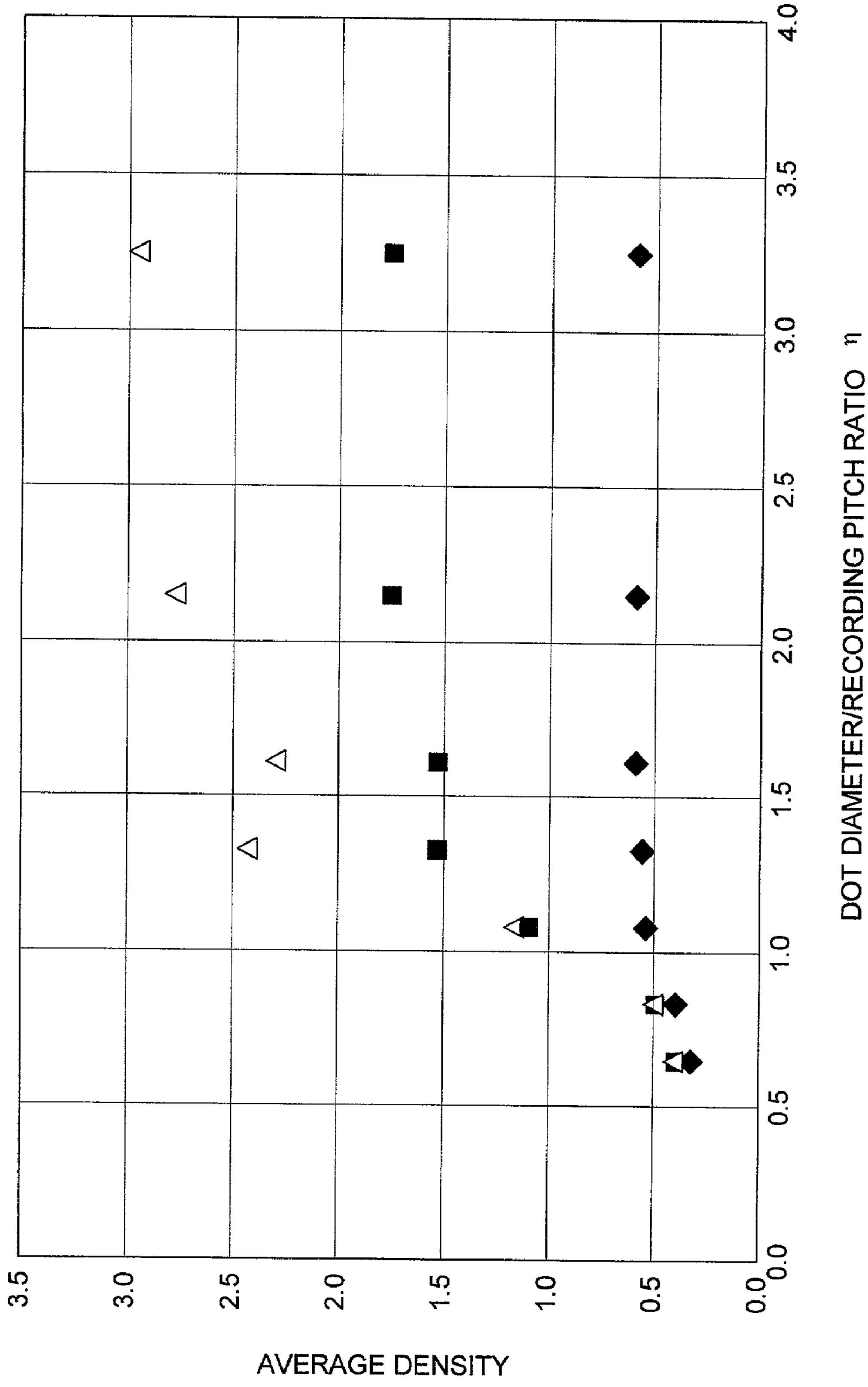
FIG. 7 is a drawing showing the relation between the dot diameter and the density.

FIG. 7 is a drawing showing the relation between the dot diameter and the average density. In the above, the average density means the average value of measured density values in the case where a uniform-density image is recorded on a recording medium by means of an image recording apparatus and density measurement is carried out for 5 arbitrary different points by means of a diffuse densitometer on the market. For example, in this example of the embodiment, density measurement was carried out by using a PDA-65 densitometer (manufactured by Konica Corp.)

Incidentally, an ink dot diameter can be measured from a 100 hold magnified photograph of the ink dot recorded by the image recording apparatus, the photograph obtained by using a transmission type electron microscope Type HU-12 (made by Hitachi, Ltd).

As regards the image recording condition in producing the uniform-density image, only (1) the ratio of the dot diameter to the pitch η and (2) the dye concentration of the ink were varied, and other factors, namely, the sub-scanning recording pitch (1440 dpi), the amount of jetted ink drops (about 7 pl per drop), and the composition of the recording medium were kept the same; further, the physical properties such as viscosity and specific weight of the ink were adjusted in such a way that the ink dot diameter on the recording medium became always approximately the same. Concerning (1), by varying the driving speed of the recording head for the main scanning, the main scanning recording pitch was varied to various values from 20 to 100 μm, and an image was produced for each of 7 values of the ratio of the dot diameter to the pitch η. Concerning (2), a uniform-density image was produced by putting one kind of ink having one of the dye concentrations on a recording medium having a density of 0.20, and the ratio of the dye concentrations of the used inks was made 1:4:7. And image density produced by each ink of respective dye concentrations are plotted by the marks of ♦, ■ and Δ. By combining (1) and (2), total 21 kinds of uniform-density images were produced and their average densities were measured.

The abscissa indicates the ratio of the dot diameter to the recording pitch η ((dot diameter)/(recording pitch)), and the ordinate indicates the average density of the uniform-density image.

If η is smaller than 1.4, owing to the presence of no print area, the average density becomes higher the higher the coverage ratio is made.

If η is greater than 1.4, the density varies in accordance with the degree of overlapping of ink dots, but if η exceeds 3.0, the average density is almost stabilized. It means that in this range, even though the fluctuation of the dot diameter is produced, the variation of the average density does not occur.

Although there is a physical limit in the amount of ink absorption by a recording medium, the stability of ink jetting, etc., in the case where ink drops of the same density are uniformly put on, it is desirable to make the dot diameter as large as possible with respect to the recording pitch for the purpose of reducing no print area.

Further, if the dot diameter is made larger, because the streaky unevenness in the sub-scanning direction is leveled out, an effect to reduce banding is also obtained.

On the other hand, if the scanning speed of the recording head is made slower, the recording pitch can be made smaller, and as the result, it is also possible to make η larger; however, it is not desirable because it causes the lowering of the recording speed. Therefore, it is desirable to practice a control to keep the dot diameter at a suitable size by the physical properties of the ink and recording medium with the amount of ink per dot jetted from the recording head kept constant. For example, by varying the viscosity of the ink, the surface energy of the recording medium, and its absorption rate, the dot diameter can be controlled; however, the physical property that is able to control the dot diameter is not limited to these.

(Relation Between Dot Diameter and Sharpness)

The relation between the ink dot diameter with respect to the recording pitch and the sharpness will be explained. In the above, the sharpness means the characteristic of the density contrast in what is called a chart image, which is obtained by periodically recording line images having a specified width with inks of different densities.

Figure 8:
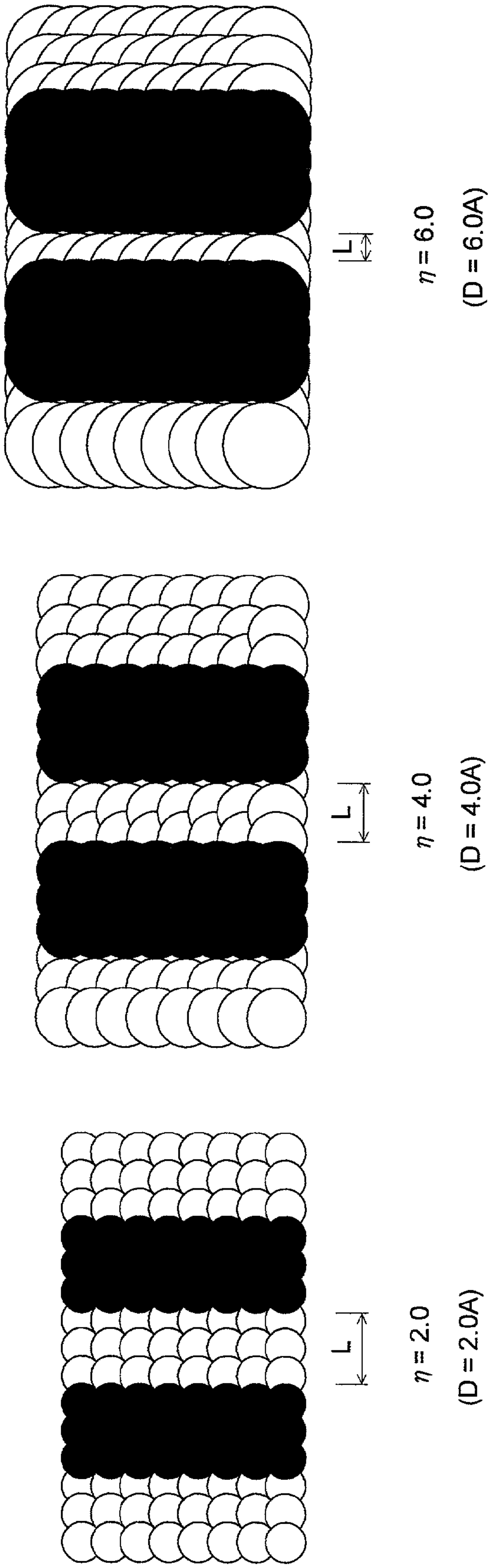
FIG. 8(*a*) to FIG. 8(*c*) are schematic drawings of a line image having a width of 8 dots per line.

FIG. 8(*a*) to FIG. 8(*c*) represent schematic drawings of line images having a width of 8 dots for a line. These drawings show line images in the case where the ratio of the dot diameter to the recording pitch η=D/A is varied, where the dot diameter is denoted by D, and the recording pitch is denoted by A.

Besides, in FIG. 8(*a*), η=2.0, in FIG. 8(*b*), η=4.0, and in FIG. 8(*c*), η=6.0; the drawings show the state that the dense ink is put uniformly on the higher-density area and the light ink is put uniformly on the lower-density area. In the case of transmission image, because the density becomes higher in accordance with the amount of the dye or pigment contained in the ink, it occurs a phenomena such that the higher-density area (the area dotted with the dense ink) gains on the lower-density area (the area dotted with the light ink) to block in the lower-density area.

For η=2.0, there is enough width of the lower-density area (L), but in accordance with η being made larger, the width (L) becomes narrower (for η=4.0), and for η=6.0, almost the whole of the lower-density area is blocked in to become indiscernible.

Because the lower-density area dotted with no ink drop is gained on by the high-density ink in an image having a high density contrast and a thin width of white void area, particularly in a letter image such as patient information attached to a simple X-ray radiograph or a CT image and a radiographing condition, there is a possibility of the white void portion in an image appearing very bad. According to a simple calculation, because the dense ink gains on by (D−A)/2 at one of the edges, the lower-density area becomes gained on by a length of 2×(D−A)/2=(D−A) from the both edges by the dense ink. Because a letter comes in a range to be capable of recognition if it has a line width of 150 μm or over, in order that the white void portion may be left not gained on by the dense ink, it is necessary that D−A<150 [μm], that is, D<A+150 [μm]. Further, in practical cases, if the white void area does not occupy at least a half or more part of the original image, letters are blocked in to become hard to read; therefore, it is desirable that D−A<75 [μm], that is, D<A+75 [μm]. For example, in the case where the recording density is 1440 dpi in main scanning x 1440 dpi in sub-scanning (corresponding to the lattice spacing of about 17.5 [μm]), it is considered a case where an image having 1024×1024 pixels is to be recorded as an image composed of pixels having a size of 70 μm (developed to a dither matrix of 4×4). In this case, one side of the image is about 71.2 mm, which is near to the output size used in actual diagnosis for an X-ray CT image and an MRI image. The width of the line in letter areas is about two times the pixel size (140 μm), which corresponds to 8 dots per line when converted into the number of dots. It is necessary that the range of D to make the white void area remain as not gained on by the dense ink is expressed by D<(17.5+150) μm, that is, D<167.5 μm. Further, it is desirable that the range of D not to make letters hard to read is expressed by D<(17.5+75) μm, that is, D<92.5 μm.

(Synthetic Evaluation of Image Quality)

As described in the above, from the view point of granularity, the stability of the average density, and sharpness, it is desirable that the ink dot diameter D satisfies the inequality 1.5A≦D≦A+150 [μm] for the recording pitch A. Besides, in the above-mentioned inequalities, it is made a premise that A satisfies the condition A≦150 μm, and a resolution based on A>150 μm is not desirable from the view point of image quality.

Further, in order to obtain a better medical-use image, it is desirable that D satisfies the following inequality: 2A≦D≦A+75 [μm]. Herein, in the above-mentioned inequalities, it is made a premise that A satisfies the condition A≦75 μm, and a resolution based on A>75 μm is not desirable from the view point of image quality.

However, because actually there is fluctuation in the jetting of ink drops, if most of the fixed ink dot diameters are included in the above-mentioned range, that is acceptable. In this example of the embodiment, the resolving power of the ink jet recording apparatus is specified to be 1440 dpi; however, even it is acceptable that the resolving power is at least 360 dpi or over, and in order to record a high-quality medical-use image, a high resolution of 720 dpi or higher is preferable.

It is not always necessary that the recording pitch in the main scanning direction Pm and the that in the sub-scanning direction Ps coincide with each other, and only it is necessary that the above-mentioned relation is effective for the one corresponding to the lower resolution, that is, for the larger recording pitch A=max(Pm, Ps).

Further, by making dot sizes in approximately a same size, distributions of dot diameters become uniform in every portion of the image, partial dot size variation can be suppressed and preferable image can be obtained.

The larger the dot diameter becomes, the more clearly the dot is sensed by human visual sensation and roughness in the image is perceived. Therefore, in cases where multi size dots are used to form an image, maximum dot diameter in the multi size dots $D_{max}$ is preferably satisfies the following relation.

$$1.5A \leqq D_{max} \leqq A+150 [\mu m]$$

By this, even the image formed by dots of dot diameter $D_{max}$, which are apt to generate a roughness in the image, becomes preferable in image quality, and further, any combination of a plurality of dots can be used to form a good image in image quality.

(Relation Between Dot Diameter and Frequency of Ink Jetting)

Up to now, the range of the dot diameter that is suitable for obtaining a good image quality has been explained; now, an image recording method to actualize it will be explained.

In a usual image recording method, it is practiced that, during one scanning, by using a single or plural nozzles, ink drops having approximately the same diameter are jetted at constant jetting intervals, and the image of one main scanning line, that is, the main scanning image line is completed by one time scanning. In the above, a main scanning line means a line of pixels arrayed in the main scanning direction, and a sub-scanning line to be described later means a line of pixels arrayed in the sub-scanning direction. In the case where the image recording method is used, in some combination of the physical properties such as the surface energy of the recording medium and its ink absorption rate, sometimes beading occurs on the surface of the recording medium. It is a phenomenon that can occur in the case where an ink drop is jetted to be put close to a previously jetted ink drop which is still remaining on the surface of the recording medium.

Figure 9:
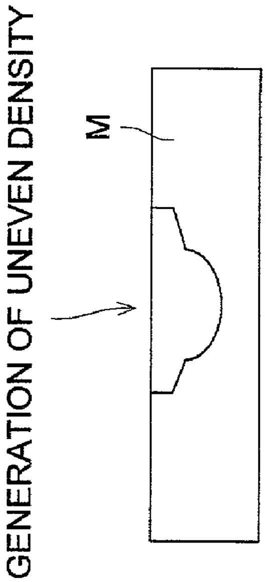
FIG. 9(*a*) to FIG. 9(*c*) are schematic drawings showing the process from ink drop landing to the absorption.
Figure 9:
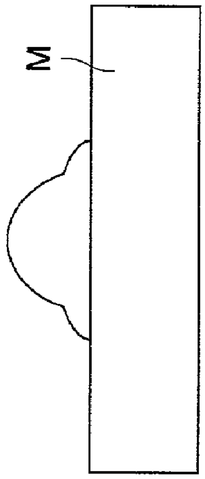
Figure 9:
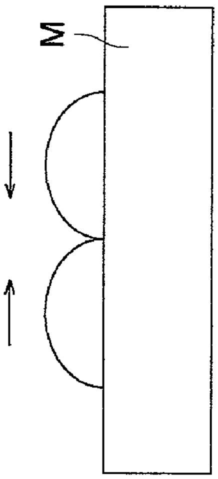

FIG. 9(*a*) to FIG. 9(*c*) represent schematic drawings showing the process from the landing to absorption of ink drops. In the case where the interval from the landing of an ink drop to the landing of the succeeding ink drop is not sufficient (refer to FIG. 9(*a*)), the succeeding ink drop couples with the previous one on the surface of the recording medium M (refer to FIG. 9(*c*)), and when the ink drops are absorbed by the recording medium M, unevenness of density is produced (refer to FIG. 9(*c*)).

If a recording medium having an extremely fast rate of absorption exists, an ink drop is immediately absorbed in the ink receiving layer after it lands on the surface of the recording medium; therefore, the previous ink drop hardly influences the succeeding ink drop. However, it requires a recording medium which absorbs completely an ink drop in its ink receiving layer within several hundreds μs or several tens Rs, and that is actually difficult to be accomplished.

Further, although the position of landing can be kept precise in the case where ink drops are continuously jetted during one scan, it sometimes occurs that the precision of the landing position deflects particularly at the beginning of ink jetting in the case where ink drops are jetted intermittently. Due to the deflection of the ink landing position, ink drops tend to be merged together and the beading will be generated. As the result, output density varies locally and there is a possibility that in some cases a pseudo-edge appears to deteriorate the image quality. This is not preferable particularly for the medical-use image, because there is a possibility that the image with a pseudo-edge is misdiagnosed as an image of diseased portion.

Therefore, it is considered to overcome the above-mentioned problem by using what is called a multiple scan recording method, that is, a method in which ink drops having approximately the same diameter are jetted at constant jetting intervals during one time scanning by using a single or multiple nozzles, and an image for one main scanning is completed through scanning of several times.

For example, when an image of one main scanning line is completed during one scan, the pitch of ink jetting, that is, jetting pitch (writing pitch) B is equal to the main scanning recording pitch A, and when an image of one main scanning line is completed during n scans (n is an arbitrary natural number), the jetting pitch B may be made nA (B=nA), where A corresponds to the above-mentioned recording pitch in the main scanning direction, and n is referred to as the number of divisional scans.

FIG. 10(*a*) to FIG. 10(*h*) show the outline of a multiple scan recording method. Only the recording head 102 which is driven in the main scanning direction and jets ink drops from the nozzles, and the recording medium M to be transported in the sub-scanning direction are noted.

For simplicity's sake, it is taken for instance a case where there is only one of the recording head 102 having 5 nozzles. The distance between nozzles corresponds to 4 times the recording pitch (=4A). FIG. 10(*a*) to FIG. 10(*h*) are drawings showing sequentially the process up to the actual completion of an image; the solid black circles (●) put on the recording medium M represent the portions which have been just printed with the latest scanning of the recording head, and the void circles (○) represent the portions which were already printed by previous scans.

This is what is called a one way printing, in which the recording head 102 makes printing during forth-moving; the recording head 102 jets ink drops as it moves forth for scanning, and while the recording head 102 is moving back, the recording medium is transported through a specified amount of distance.

Subsequently, by repeating the above-mentioned operation, an image is recorded. For example, as shown in FIG. 10, with the number of divisional scans n made 2 (n=2), through repeating the periodic operation in such a manner as to make the amount of transporting of the recording medium "2A→3A→2A→3A→ - - - " and the position of ink jetting "(as regards the sub-scanning arrays) odd-number array→even-number array→odd-number array→even-number array→ - - - ", an arbitrary two-dimensional image can be recorded without a void area. Further, by increasing the number of the nozzles or the recording heads suitably, and combining inks having different colors or combining inks of colors having the same hue but different densities respectively, it becomes possible to record a complex image having multiple colors or mono-color, and multiple gray levels in accordance with the design.

The average value of the dot diameter D recorded in a recording medium is denoted by Dave, and the ratio of the jetting pitch to the dot diameter $\epsilon$ is defined as $\epsilon$=(jetting pitch)/(average dot diameter)=(number of divisional scans)·(recording pitch)/(average dot diameter)=nA/D.

FIG. 11(*a*-1) to FIG. 11(*b*-3) represent the states of images after recording depending on the difference of the recording method (in the case of $\eta$=2.0).

FIG. 11(*a*-1) corresponds to the case where ink drops are jetted at every dot diameter's distance ($\epsilon$=1.0). A numeral (m) enclosed by a circle means that the ink dot located at the position of the numeral (m) in the drawing is put during the mth (m=the numeral) scanning by the ink jetting of the recording head to record an image, and the image is completed through 8 times of scans. The image for one main scanning is completed by two scans.

As shown in FIG. 11(*a*-2) and FIG. 11(*a*-3), if two ink dots are coupled with each other, they attract each other to form a larger dot; thus, a local clearance is produced on the recording medium, and a density unevenness appears; that produces a possibility to bring about degradation of granularity.

FIG. 11(*b*-1) corresponds to the case where ink drops are jetted every two dot diameters' distance ($\epsilon$=2.0). Because there is enough distance between dots (refer to FIG. 11(*b*-2)), each of the ink drops is absorbed as it is into the ink receiving layer of the recording medium; therefore, an output density in accordance with the design can be obtained, and further, a good image can be obtained (refer to FIG. 11(*b*-3)).

FIG. 12 is a drawing showing the result of making a subjective evaluation of streaky unevenness. A uniform-density image was produced for each of the numbers of divisional scans, which are 1 to 6, while $\eta$ was kept at a constant value of 2.17 ($\eta$=2.17), and the result of a subjective evaluation made visually is shown. It was confirmed that a good image in which no streaky unevenness was to be detected could be obtained for $\epsilon$>2.0.

If an image is recorded with jetting pitch excessively made large with respect to the dot diameter and the number of divisional scans increased, it is expected that the recording time becomes longer if the number of the used nozzles is kept constant. Because an optimum number of the divisional scans is determined by a balance between the precision in the transport of the recording medium and the ink landing position and the recording time, for example, it is appropriate to make the number of the divisional scans a suitable value falling within a range determined by the inequality $2 \leqq \epsilon \leqq 8$.

As shown in this example of the embodiment, in the case where an image is recorded with an enough ink jetting interval maintained in the main scanning, it never occurs the problem of beading if the design is made in such a manner that the recording medium absorbs ink within twice the main scanning time (during moving forth and back) for one way scan printing or within the main scanning time for both way scan printing. Further, as regards the sub-scanning direction, because it never occurs that an ink drop is put on a position in the neighborhood of an ink drop having been put already before one main scan or two main scans are finished, the effect of the jetting pitch can be completely neglected.

Besides, in this example of the embodiment, explanation has been limited to the cases of a medical-use image to be used in diagnosis, but this invention may be applied to an image to be used as reference, or this invention may be applied not only to a medical use but also to a wide variety of imaging fields using a digital printer. For example, this can be applied to a transmission image on a sheet for use in an OHP (overhead projector).

Incidentally, in this embodiment, explanation has been made for an ink jet recording apparatus, however, the recording method of the present invention is not necessarily restricted to the ink jet recording apparatus and can be widely applied to various methods and apparatuses which use numerous dots to form output images. Especially, in an ink jet recording, microscopic variations such as ink bleeding, beading etc. tend to cause image deterioration, therefore this embodiment is remarkably preferable.

Further, the present invention can be applied as well to a color image and a monochromatic image, to combination of color inks with same hue, or to combination of color inks with different hue. In the color image, it is possible to suppress color variation caused by beading of ink drops. In the monochromatic image, the effect of the present invention is remarkable because a stable gradation can be obtained in the monochromatic image where contrast resolution of human visual sensation is higher for gray than for other colors. Especially in cases where an image is recorded by using color inks with same hue, a monochromatic image with multiple gradation and stable output density can be preferably obtained.

(Effect of the Invention)

As described in the above, by using the structure (1), by making the dot diameter D recorded on a recording medium fall within a range expressed by $1.5A \leqq D \leqq A+150$ [μm], a high-quality image can be obtained with the influence of the fluctuating factors in recording such as the dot diameter of ink and the deviation of the landing position of an ink drop suppressed.

By using the structure (2), by making the aforesaid dot diameter D fall within a range expressed by $2A \leqq D \leqq A+75$ [μm], a high-quality image can be obtained with the influence of the fluctuating factors in recording such as the dot diameter and the deviation of the landing position of ink further suppressed.

By using the structure (3), by making the resolution equal to 360 dpi or higher, a high-quality image can be obtained.

By using the structure (4), by making the resolution equal to 720 dpi or higher, a higher-quality image can be obtained.

By using the structure (5), by scanning a main scanning image line, which is an image line composed of pixels arrayed in the main scanning direction, a plurality of times to complete an image, streaky unevenness caused by an error of the amount of transport in the sub-scanning direction can be reduced.

By using the structure (6), by making the writing pitch Pm' in the main scanning direction in one time scanning fall within a range expressed by $Pm' \geqq 2Dave$, where Dave denotes the average value of the dot diameter values recorded on the aforesaid recording medium, image quality becomes good in spite of the fluctuation of the dot diameter size and the landing position of the ink drop, without bringing about degradation of granularity and edge emphasis owing to beading (coupling of neighboring dots to each other) in one and the same scanning.

By using the structure (7), dot sizes are made in approximately a same size, distributions of dot diameters become uniform in every portion of the image, partial dot size variation can be suppressed and preferable image can be obtained.

By using the structure (8), even the image formed by dots of dot diameter $D_{max}$, which are apt to generate a roughness in the image, becomes preferable in image quality, and further, any combination of a plurality of dots can be used to form a good image in image quality.

By using the structure (9), by using a method as set forth in any one of the structures (1) to (6), a high-quality print image can be obtained with the influence of the fluctuating factors such as the dot diameter of ink and the deviation of the landing position of an ink drop suppressed.

What is claimed is:

1. A method of recording a transmission image for medical use that is composed of dots on a recording medium, said method comprising:

moving the recording medium in a sub-scanning direction; and moving an inkjet recording head with respect to the recording medium in a main scanning direction that crosses the sub-scanning direction;

wherein a diameter D of each dot recorded on the recording medium falls within a range expressed by $1.5A \leqq D \leqq A+150$ μm, where:

$$A = \max(Pm, Ps);$$

Pm is a pitch of an array of pixels in the main scanning direction; and

Ps is a pitch of an array of pixels in the sub-scanning direction.

2. The method of recording a transmission image of claim 1, wherein the dot diameter D falls within a range expressed by $2A \leqq D \leqq A+75$ μm.

3. The method of recording a transmission image of claim 1, wherein a resolution of the image recorded on the medium is not lower than 360 dpi.

4. The method of recording a transmission image of claim 1, wherein a resolution of the image recorded on the medium is not lower than 720 dpi.

5. The method of recording a transmission image of claim 1, wherein the image is completed by scanning a plurality of times in a same main-scanning image line, which is an image line composed of pixels arrayed in the main scanning direction.

6. The method of recording a transmission image of claim 5, wherein a writing pitch Pm' in the main scanning direction in one time of scanning each main-scanning image line falls within a range expressed by Pm' $\geqq 2D_{avg}$, where $D_{avg}$ denotes an average diameter value of dots recorded on the recording medium.

7. The method of recording a transmission image of claim 1, wherein diameters of the dots on the recording medium are approximately of a same size.

8. A method of recording a transmission image for medical use that is composed of dots on a recording medium, said method comprising:

moving the recording medium in a sub-scanning direction; and moving an inkjet recording head with respect to the recording medium in a main scanning direction that crosses the sub-scanning direction;

wherein the dots on the recording medium have a plurality of sizes, and a maximum diameter of the plurality of sizes of dots $D_{max}$ falls within a range expressed by $1.5A \leqq D_{max} \leqq A+150$ μm, where:

$$A=\max(Pm, Ps);$$

Pm is a pitch of an array of pixels in the main scanning direction; and

Ps is a pitch of an array of pixels in the sub-scanning direction.

9. An image recording apparatus for recording a transmission image for medical use that is composed of dots on a recording medium, said apparatus comprising:

an image processor to process medical image data;

a sub-scanning device to move the recording medium in a sub-scanning direction;

an inkjet recording head to record the image composed of dots on the recording medium; and a main-scanning device to move the recording head with respect to the recording medium in a main scanning direction that crosses the sub-scanning direction;

wherein each dot recorded on the recording medium by the recording head has a diameter D that falls within a range expressed by $1.5A \leqq D \leqq A+150$ μm, where:

$$A=\max(Pm, Ps);$$

Pm is a pitch of an array of pixels in the main scanning direction; and

Ps is a pitch of an array of pixels in the sub-scanning direction.

10. The image recording apparatus of claim 9, wherein the dot diameter D falls within a range expressed by $2A \leqq D \leqq A+75$ μm.

11. The image recording apparatus of claim 9, wherein a resolution of the image recorded on the medium is not lower than 360 dpi.

12. The image recording apparatus of claim 9, wherein a resolution of the image recorded on the medium is not lower than 720 dpi.

13. The image recording apparatus of claim 9, wherein the image is completed by scanning a plurality of times in a same main-scanning image line, which is an image line composed of pixels arrayed in the main scanning direction.

14. The image recording apparatus of claim 13, wherein a writing pitch Pm' in the main scanning direction in one time of scanning each main scanning line falls within a range expressed by Pm'$\geqq 2D_{avg}$, where $D_{avg}$, denotes the average value of dot diameters recorded on the recording medium.

15. The image recording apparatus of claim 9, wherein diameters of the dots on the recording medium are approximately of a same size.

16. The image recording apparatus of claim 9, wherein the image recording apparatus records the image by using a plurality of different density inks having a same hue.

17. An image recording apparatus for recording a transmission image for medical use that is composed of dots on a recording medium, said apparatus comprising:

an image processor to process medical image data;

a sub-scanning device to move the recording medium in a sub-scanning direction;

an inkjet recording head to record the image composed of dots on the recording medium; and a main-scanning device to move the recording head with respect to the recording medium in a main scanning direction that crosses the sub-scanning direction;

wherein the dots on the recording medium have a plurality of sizes, and a maximum diameter of the plurality of sizes of dots $D_{max}$ falls within a range expressed by $1.5A \leqq D_{max} \leqq A+150$ μm, where:

$$A=\max(Pm, Ps);$$

Pm is a pitch of an array of pixels in the main scanning direction; and

Ps is a pitch of an array of pixels in the sub-scanning direction.

* * * * *